US010373570B2

(12) United States Patent
Lin et al.

(10) Patent No.: US 10,373,570 B2
(45) Date of Patent: Aug. 6, 2019

(54) DISPLAY APPARATUS AND IMAGE PROCESSING METHOD THEREOF

(71) Applicant: Au Optronics Corporation, Hsinchu (TW)

(72) Inventors: Hui-Feng Lin, Taichung (TW); Sheng-Wen Cheng, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 15/792,787

(22) Filed: Oct. 25, 2017

(65) Prior Publication Data

US 2019/0027101 A1 Jan. 24, 2019

(30) Foreign Application Priority Data

Jul. 24, 2017 (TW) .............................. 106124757 A (51) Int. Cl.
*G09G 3/36* (2006.01)
*G09G 3/34* (2006.01)
(Continued)

(52) U.S. Cl.
CPC ..... *G09G 3/3426* (2013.01); *G02F 1/133509* (2013.01); *G02F 1/133602* (2013.01); *G06T 11/001* (2013.01); *G09G 3/2096* (2013.01); *G09G 3/3607* (2013.01); *G09G 5/377* (2013.01); *G06T 2200/28* (2013.01); *G09G 3/2044* (2013.01); *G09G 3/2059* (2013.01); *G09G 2300/023* (2013.01); *G09G 2320/0276* (2013.01); *G09G 2320/066* (2013.01); *G09G 2360/144* (2013.01)

(58) Field of Classification Search
USPC .............. 345/102, 207, 690, 691, 697, 619; 250/271
See application file for complete search history.

(56) References Cited

U.S. PATENT DOCUMENTS 6,870,547 B1 *  3/2005  Crosby ............... G06F 16/9577
                                                            345/619
7,012,621 B2 *  3/2006  Crosby ............... G06F 16/9577
                                                            345/619
(Continued)

FOREIGN PATENT DOCUMENTS

CN            103295545            9/2013

*Primary Examiner* — Thuy N Pardo
(74) *Attorney, Agent, or Firm* — JCIPRNET (57) ABSTRACT

A display apparatus and an image data processing method thereof are provided. The display apparatus includes a first display panel, a second display panel and a backlight module. The image processing method includes: receiving image data; detecting an ambient temperature and an ambient brightness to obtain a detection result; when the ambient temperature is lower than a preset temperature value, selecting the image data to be divided into a plurality block data by display location or gray level range according to the ambient brightness, and performing a blur process on the block data to generate adjusted image data; when the ambient temperature is not lower than the preset temperature value, performing a binary process on the image data to generate the adjusted image data; and driving the second display panel according to the adjust image data.

28 Claims, 10 Drawing Sheets

(51) Int. Cl.
  *G06T 11/00*   (2006.01)
  *G09G 3/20*   (2006.01)
  *G02F 1/1335*   (2006.01)
  *G09G 5/377*   (2006.01)

(56) References Cited

U.S. PATENT DOCUMENTS

| | | | |
|---|---|---|---|
| 7,636,076 B2 | 12/2009 | Hung et al. | |
| 8,482,499 B2 | 7/2013 | Kimura | |
| 8,824,828 B1* | 9/2014 | Winn | G09G 5/00 |
| | | | 250/271 |
| 9,305,520 B2 | 4/2016 | Higashi et al. | |
| 10,109,035 B2* | 10/2018 | Chen | G06F 3/04842 |
| | | | 345/102 |
| 2005/0052469 A1* | 3/2005 | Crosby | G06F 16/9577 |
| | | | 345/619 |
| 2008/0088649 A1* | 4/2008 | Ikeno | G09G 3/3611 |
| | | | 345/690 |
| 2011/0205259 A1 | 8/2011 | Hagood, IV | |
| 2011/0267382 A1* | 11/2011 | Fergason | G02F 1/1336 |
| | | | 345/690 |
| 2013/0050165 A1* | 2/2013 | Northway | G09G 3/3466 |
| | | | 345/207 |
| 2013/0069924 A1* | 3/2013 | Robinson | G09G 3/20 |
| | | | 345/207 |
| 2013/0222439 A1* | 8/2013 | Higashi | G09G 5/10 |
| | | | 345/690 |
| 2015/0042704 A1* | 2/2015 | Smith | G09G 3/36 |
| | | | 345/697 |
| 2015/0054858 A9* | 2/2015 | Lu | H04N 5/58 |
| | | | 345/690 |
| 2015/0130860 A1* | 5/2015 | Park | G09G 3/3225 |
| | | | 345/691 |
| 2017/0116706 A1* | 4/2017 | Chen | G06F 3/04842 |
| | | | 345/102 |

* cited by examiner

DISPLAY APPARATUS AND IMAGE PROCESSING METHOD THEREOF

CROSS-REFERENCE TO RELATED APPLICATION

This application claims the priority benefit of Taiwan application serial no. 106124757, filed on Jul. 24, 2017. The entirety of the above-mentioned patent application is hereby incorporated by reference herein and made a part of this specification.

BACKGROUND OF THE INVENTION

1. Field of the Invention

The invention relates to a display apparatus and an image processing method thereof, and particularly relates to a display apparatus having two display panels and an imaging processing method thereof.

2. Description of Related Art

In the era of information, providing a high-quality display image has become a required function of electronic apparatuses nowadays.

To improve the contrast in the image, the conventional liquid crystal display may improve the display quality thereof by adopting the technology of multiple driving dynamic backlight adjustment. However, due to the limitation of size, the backlight diffusion becomes more significant under the condition that the number of backlight blocks remains the same. Thus, in the conventional technologies, light guide plates and complicated backlight module control mechanisms are adopted to increase the contrast of the image. As a consequence, the manufacturing cost is increased.

SUMMARY OF THE INVENTION

The invention provides a display image and an image processing method thereof capable of effectively reinforcing a display quality of a high-contrast image display apparatus having two panels.

An image processing method according to an embodiment of the invention is adapted for a display apparatus. The display apparatus includes a first display panel, a second display panel and a backlight module. The image processing method includes: receiving image data; detecting an ambient temperature and an ambient brightness to obtain a detection result; when the ambient temperature is lower than a preset temperature value, selecting the image data to be divided into a plurality block data by display location or gray level range according to the ambient brightness, and performing a blur process on the block data to generate adjusted image data; when the ambient temperature is not lower than the preset temperature value, performing a binary process on the image data to generate the adjusted image data; and driving the second display panel according to the adjust image data.

A display apparatus according to an embodiment of the invention includes a first display panel, a second display panel, a backlight module, and a controller. The second display panel is disposed to be overlapped with the first display panel. The backlight module is coupled to the second display panel. The controller is coupled to the first display panel, the second display panel, and the backlight module. The controller is configured to: detect an ambient temperature and an ambient brightness to obtain a detection result; select the image data to be divided into a plurality of block data by display location or gray level range according to the ambient brightness and perform a blur process on the block data to generate adjusted image data, when the ambient temperature is lower than a preset temperature value; perform a binary process on the image data to generate the adjusted image data when the ambient temperature is not lower than the preset temperature value; and drive the second display panel according to the adjusted image data.

Based on the above, in the display apparatus according to the embodiments of the invention, the display image of the second display panel is adjusted under the conditions of different ambient temperatures and different ambient brightnesses according to the detection results of the ambient temperature and the ambient brightness, so as to reinforce the display quality of the display apparatus with a high contrast.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
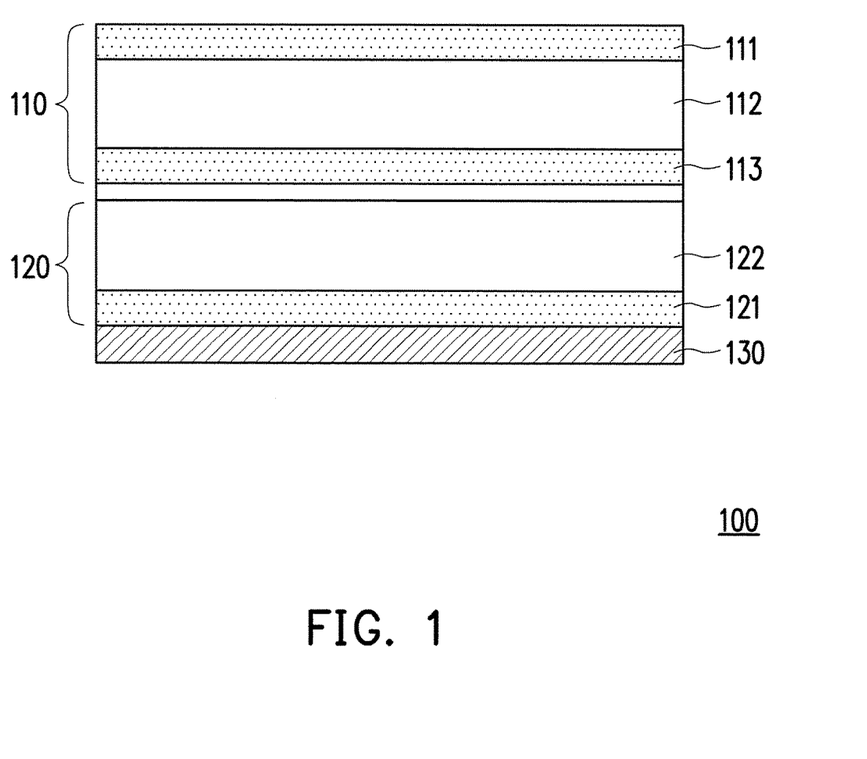
FIG. 1 is a schematic view illustrating a display apparatus suitable for an image processing method according to an embodiment of the invention.

Referring to FIG. 1, FIG. 1 is a schematic view illustrating a display apparatus suitable for an image processing method according to an embodiment of the invention. A display apparatus 100 includes a first display panel 110, a second display panel 120, and a backlight module 130. The first display panel 110, the second display panel 120, and the backlight module 130 are sequentially stacked. In addition, the first display panel 110 includes polarizers 111 and 113 and a liquid crystal layer 112 disposed between the polarizers 111 and 113. The second display panel 120 includes a polarizer 121 and a liquid crystal layer 122. The liquid crystal layer 122 is disposed to be adjacent to the polarizer 113 of the first display panel 110, and the polarizer 121 is disposed between the liquid crystal layer 122 and the backlight module 130.

Figure 2:
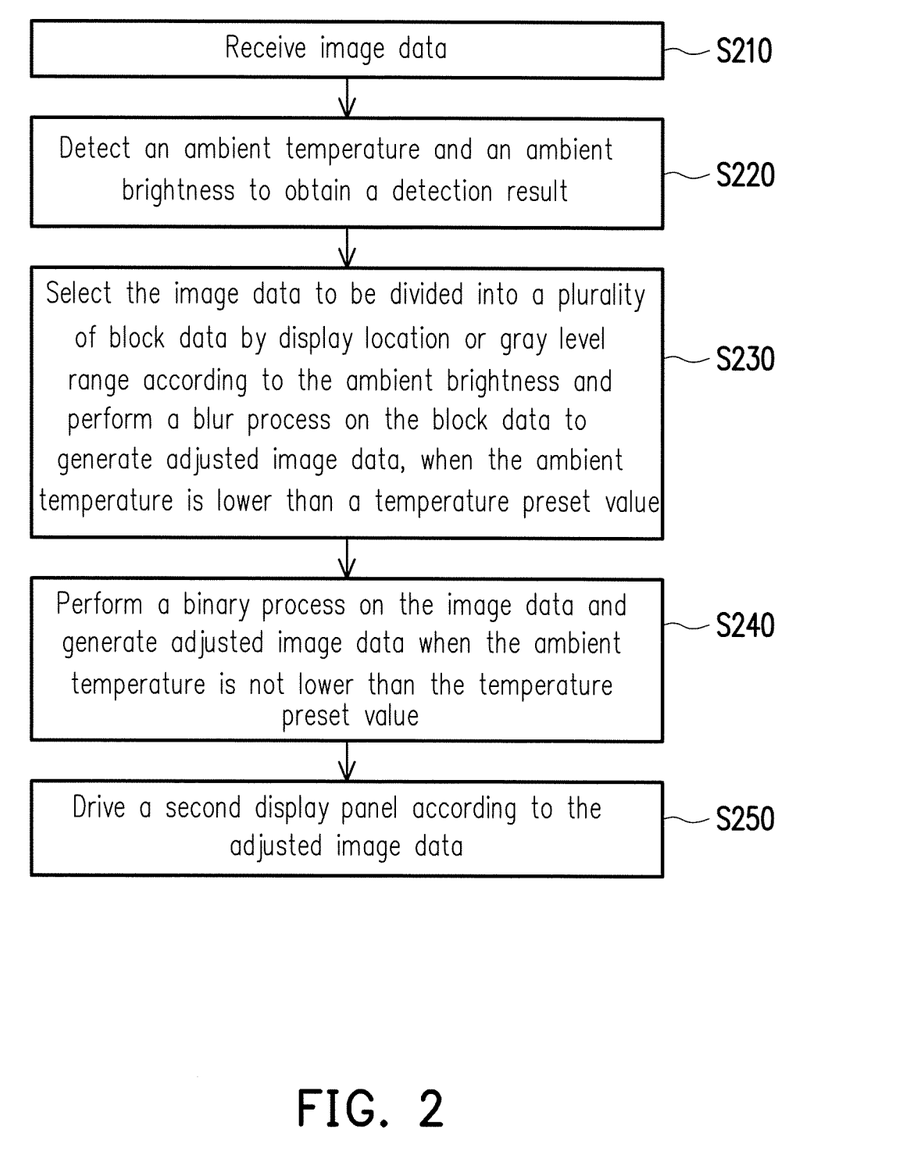
FIG. 2 is a flowchart illustrating an image processing method according to an embodiment of the invention.

Referring to FIG. 2, FIG. 2 is a flowchart illustrating an image processing method according to an embodiment of the invention. Steps in the method of the embodiment may be carried out by the display apparatus 100 shown in FIG. 1 or other similar display apparatuses having two display panels. In the image processing method of the embodiment, image data are received at Step S210, and an ambient temperature and an ambient brightness are detected at Step S220 to obtain a detection result. Then, at Step S230, determination is made according to the detection result. When the ambient temperature is lower than a preset temperature value, the image data are selected to be divided into a plurality of block data by display location or gray level range according to the ambient brightness, and a blur process is performed on the block data to generate adjusted image data.

Specifically, when the detected ambient temperature is lower than the preset temperature value, at the Step S230, the image data may be divided into the block data by display location or gray level range according to the detected ambient brightness. Also, the blur process is performed on the block data to generate the adjusted image data. In detail, at the Step S230, the detected ambient brightness is compared with a preset brightness threshold value, and when the ambient brightness is greater than the brightness threshold value, the image data are divided into the block data by display location. Alternatively, if the ambient brightness is not greater than the brightness threshold value, the image data are divided into the block data by gray level range.

Moreover, at Step S240, if the detection result obtained at the Step S220 indicates that the ambient temperature is not lower than the preset temperature value, a binary process is performed on the image data to generate the adjusted image data.

At Step S250, the second display panel is driven according to the adjusted image data to facilitate a contrast of a display frame.

Figure 3:
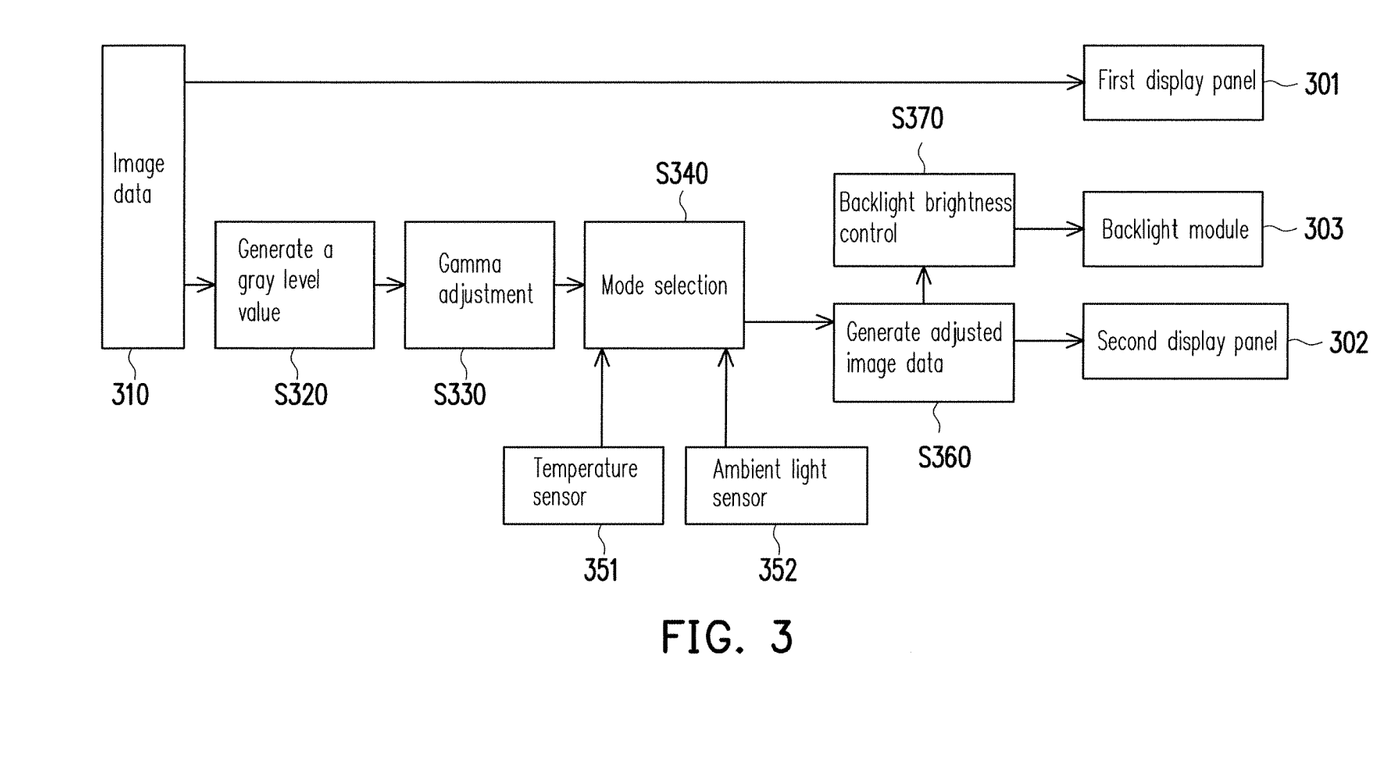
FIG. 3 is a schematic view illustrating an image processing method according to an embodiment of the invention.

Referring to FIG. 3, FIG. 3 is a schematic view illustrating an image processing method according to an embodiment of the invention. In the embodiment, an image data 310 is received, and image processing is performed. At Step S320, a gray level value is generated according to the image data 310, and a gamma adjustment is performed on the generated gray level value at Step S330. The gray level value generated at the Step S320 is generated by processing a plurality of color components (such as red, green, and blue) of a display pixel. A maximum value of red, green, and blue brightness values in the display pixel is computed to serve as the gray level value of the display pixel.

In addition, in the embodiment, a temperature sensor 350 and an ambient light sensor 352 are disposed to respectively capture the ambient temperature and the ambient brightness. At Step S340, mode selection is carried out according to the ambient temperature and the ambient brightness. In addition, the Step S230 or the Step S240 is carried out according to the gray level value generated from the image data. Moreover, the adjusted image data are generated at Step S360. According to the adjusted image data, backlight brightness adjustment is performed at Step S370 to drive a backlight module 303 accordingly. In addition, a second display panel 302 is driven according to the adjusted image data, whereas a first display panel 301 may be driven according to the original image data.

In the embodiment, the first display panel 301 may be a front display panel, and the second display panel 302 may be a rear display panel.

Figure 4:
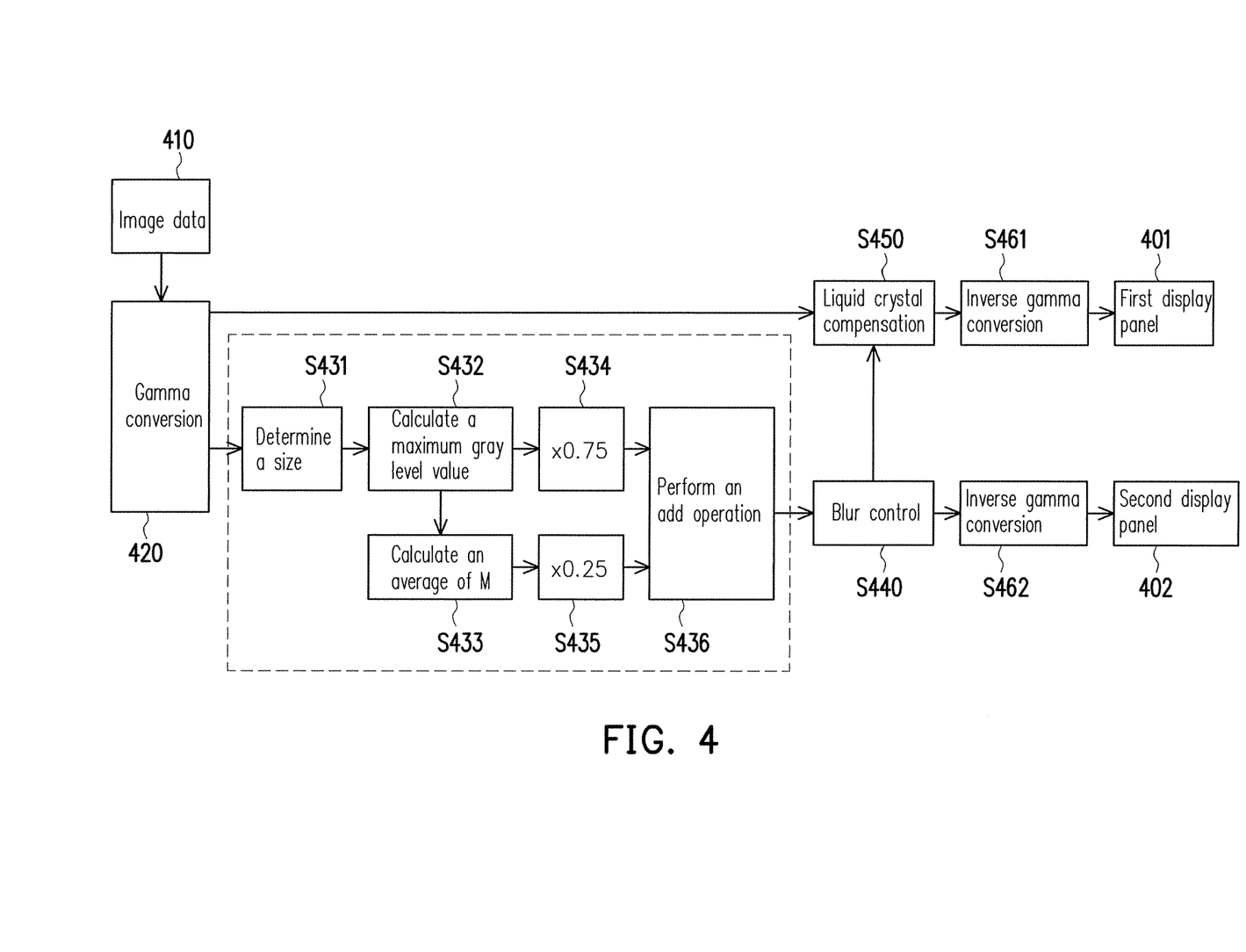
FIG. 4 is a schematic view illustrating an image processing method according to another embodiment of the invention.

Referring to FIG. 4, FIG. 4 is a schematic view illustrating an image processing method according to another embodiment of the invention. When the detected ambient temperature is lower than the preset temperature value (e.g., 60° C.), and the ambient brightness is not greater than the brightness threshold value (e.g., 10k 1×), the image processing method shown in FIG. 4 may be performed. First of all, a gamma conversion 420 is performed on an image data 410. Then, at Step S431, a size of a plurality of block data obtained by dividing the image data 410 is determined, and the image data 410 is divided into the block data based on the determined size. Taking the image 410 with a resolution of 1920×720 as an example, the size of each block data needs to be greater than 36×36 pixels and smaller than 50×50 pixels. Assuming that each block data includes 48×36 pixels, for example, 800 block data are obtained by dividing the image data 410.

At Step S432, a maximum gray level value M is computed for each of the block data, and at Step S433, an average of the maximum gray level values M of all the block data are computed. Then, at Step S434 and Step S435, the maximum gray level values M and the average of the maximum gray level values M are respectively multiplied by different weight values. Specifically, at the Step S434, the maximum gray level value M of each of the block data are multiplied by a first weight value (e.g., 0.75), and at the Step S435, the average of the maximum gray level values of all the block data are multiplied by a second weight value (e.g., 0.25). The values of 0.75 and 0.25 are merely as an example of the first weight value and the second weight value. The designer may set the first weight value and the second weight value based on needs. In addition, a total of the first weight value and the second weight value is 1, and the first weight value is greater than the second weight value.

Figure 5:
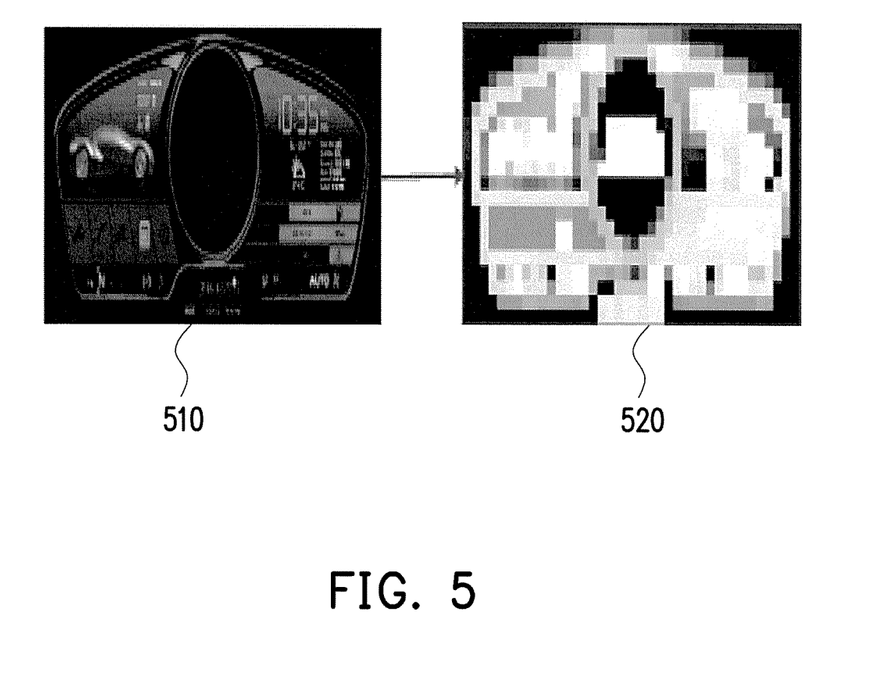
FIG. 5 is a schematic view illustrating a display image and an adjusted display image.

Referring to FIG. 5, FIG. 5 is a schematic view illustrating a display image and an adjusted display image. An image 510 represents a display image according to the original image data 410, and an image 520 represents an adjusted display image according to the adjusted image data.

Referring to FIG. 4 again, at Step S436, an add operation is performed on computation results obtained at the Step S434 and S435, and a plurality of adjusted block data respectively corresponding to the block data are generated. In some embodiments of the invention, a total of a first multiplication result and a second multiplication result generated at the Step S434 and S435 may be adjusted according to an adjustment lookup table to generate the respective adjusted block data accordingly. The adjustment lookup table defines the total and the values of the adjusted block data generated correspondingly. The adjustment lookup table may be as shown in Table 1.

TABLE 1

| Input | Output |
|---|---|
| 0 | 0 |
| 1 | 1 |
| 2 | 2 |
| 3 | 2 |
| 4 | 3 |
| 5 | 3 |
| 6 | 4 |
| 7 | 4 |
| 8 | 5 |
| 9 | 5 |
| 10 | 6 |
| 11 | 6 |
| 12 | 7 |
| 13 | 7 |
| 14 | 8 |
| 15 | 9 |
| 16 | 9 |
| 17 | 10 |
| 18 | 10 |
| 19 | 11 |
| 20 | 12 |
| 21 | 12 |
| 22 | 13 |
| 23 | 14 |
| 24 | 14 |
| 25 | 15 |
| 26 | 16 |
| 27 | 17 |
| 28 | 17 |
| 29 | 18 |
| 30 | 19 |
| 31 | 20 |
| 32 | 20 |
| 33 | 21 |
| 34 | 22 |
| 35 | 23 |
| 36 | 24 |
| 37 | 25 |
| 38 | 26 |
| 39 | 27 |
| 40 | 28 |
| 41 | 29 |
| 42 | 30 |
| 43 | 32 |
| 44 | 33 |
| 45 | 35 |
| 46 | 36 |
| 47 | 38 |
| 48 | 40 |
| 49 | 43 |
| 50 | 50 |
| 51 | 58 |
| 52 | 60 |
| 53 | 63 |
| 54 | 65 |
| 55 | 66 |
| 56 | 68 |
| 57 | 69 |
| 58 | 70 |
| 59 | 72 |
| 60 | 73 |
| 61 | 74 |
| 62 | 75 |
| 63 | 76 |
| 64 | 77 |
| 65 | 78 |
| 66 | 79 |
| 67 | 80 |
| 68 | 80 |
| 69 | 81 |
| 70 | 82 |
| 71 | 83 |
| 72 | 84 |
| 73 | 84 |

TABLE 1-continued

| Input | Output |
|---|---|
| 74 | 85 |
| 75 | 86 |
| 76 | 87 |
| 77 | 87 |
| 78 | 88 |
| 79 | 89 |
| 80 | 89 |
| 81 | 90 |
| 82 | 90 |
| 83 | 91 |
| 84 | 92 |
| 85 | 92 |
| 86 | 93 |
| 87 | 94 |
| 88 | 94 |
| 89 | 95 |
| 90 | 95 |
| 91 | 96 |
| 92 | 96 |
| 93 | 97 |
| 94 | 97 |
| 95 | 98 |
| 96 | 98 |
| 97 | 99 |
| 98 | 99 |
| 99 | 100 |
| 100 | 100 |

Figure 6:
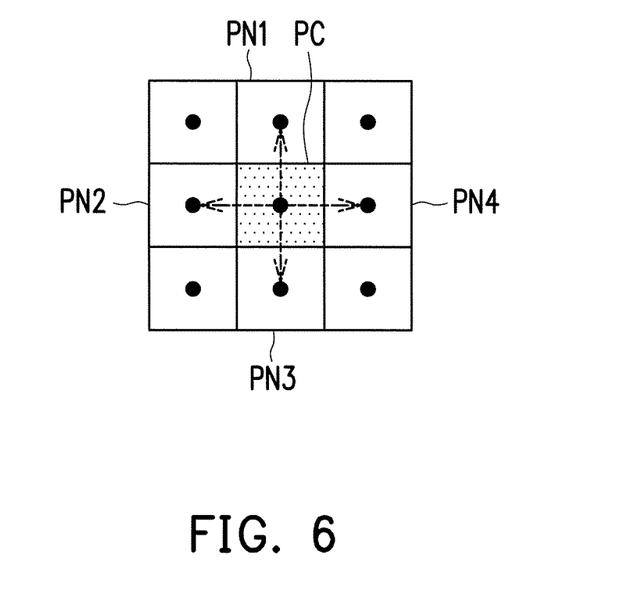
FIG. 6 is a schematic view illustrating blur control according to an embodiment of the invention.

At Step S440, blur control is performed on the adjusted block data generated at Step S436. The blur control may include performing low-pass filtering on the adjusted block data or performing interpolation on the adjusted block data. Referring to FIG. 6, FIG. 6 is a schematic view illustrating blur control according to an embodiment of the invention. In FIG. 6, the blur control may include adjusting a gray level value of a processed pixel PC in the adjusted block data. In addition, an average of the gray level value of the processed pixel PC and gray level values of a plurality of adjacent pixels PN1 to PN4 is computed to serve as a new gray level value of the processed pixel PC for the purpose of blurring.

Referring to FIG. 4, at Step S450, liquid crystal compensation is performed according to the blurred adjusted image data. In the liquid crystal compensation, a plurality of values of the blurred adjusted image data are read, and reciprocals of the values in the blurred adjusted image data are computed to generate compensation data. Then, the compensation data are synthesized with the image data 410 to generate compensated image data. In the embodiment, after undergoing inverse gamma conversion, the compensated image data may serve to drive the first display panel 401.

Figure 7:
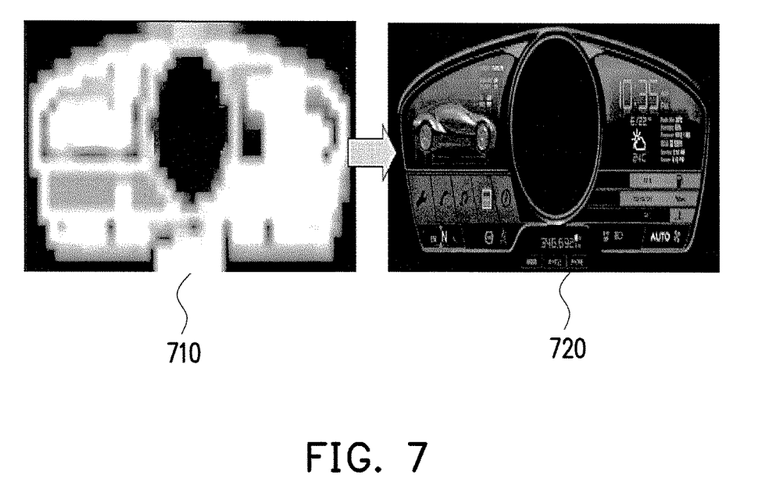
FIG. 7 is a schematic view illustrating display images corresponding to adjusted image data after blurring and compensated image data.

Referring to FIG. 7, FIG. 7 is a schematic view illustrating display images corresponding to adjusted image data after blurring and compensated image data. An image 710 represents a display image corresponding to the blurred adjusted image data, and an image 720 represents a display image corresponding to the compensated image data.

Also, after the blurred adjusted image data generated at Step S440 undergo inverse gamma conversion (Step S462), the blurred adjusted image may serve to drive the second display panel 402.

It should also be noted that, in the embodiment, when the ambient brightness is not greater than the brightness threshold value, a light emission rate of the backlight module is set at 100%.

Figure 8:
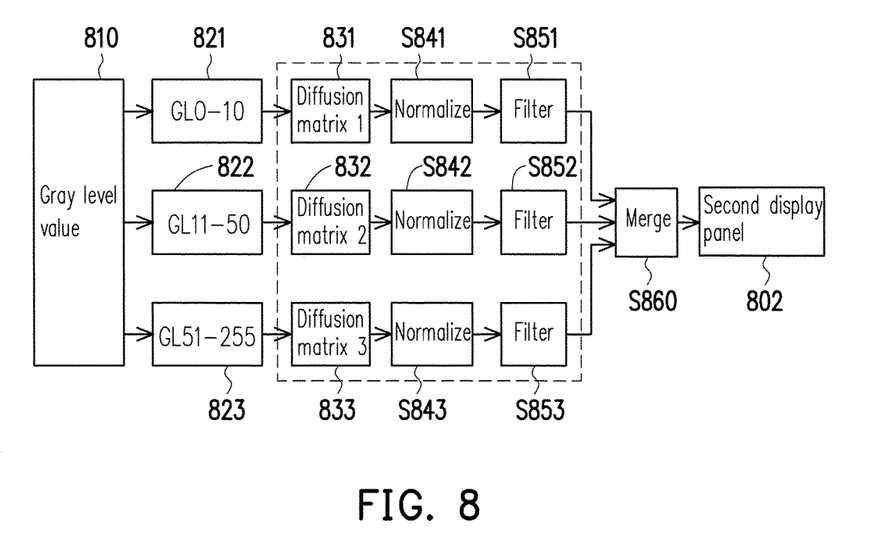
FIG. 8 is a schematic view illustrating an image processing method according to yet another embodiment of the invention.

Referring to FIG. 8, FIG. 8 is a schematic view illustrating an image processing method according to yet another embodiment of the invention. When the detected ambient temperature is lower than the preset temperature value, and the ambient brightness is greater than the brightness threshold value (e.g., 10k 1x), the image processing method shown in FIG. 8 may be performed. The image data may be divided by ranges of gray level values 810 (i.e., gray level ranges) of the image data to obtain a plurality of block data. In the embodiment, the gray level ranges include three ranges of gray level values GL respectively from 0 to 10, 11 to 50, and 51 to 255, and three block data 821, 822, and 823 are obtained. In addition, three diffusion matrices 831, 832, and 833 are respectively disposed in correspondence with the block data 821, 822, and 823 of different gray level ranges. In addition, computation (multiplication) is respectively performed between the block data 821, 822, and 823 and the diffusion matrices 831, 832, and 833 to respectively generate a plurality of diffusion block data.

The diffusion block data are respectively normalized at Steps S841 to S843, and are respectively filtered at Steps S851 to S853 to generate a plurality of processed block data. The processed data are merged at Step S860, and the adjusted image data are generated. In addition, the adjusted image data may serve to drive the second display panel 802.

Figure 9:
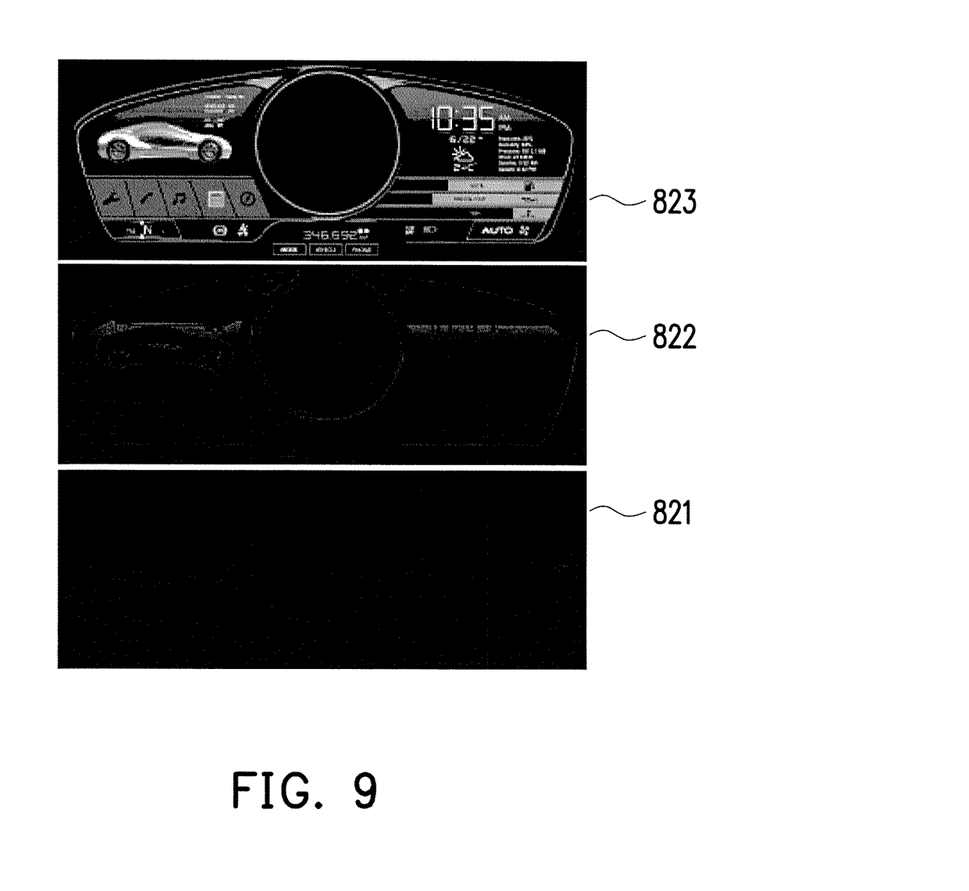
FIG. 9 is a schematic view illustrating display images corresponding to block data obtained according to different gray level ranges according to an embodiment.
Figure 10:
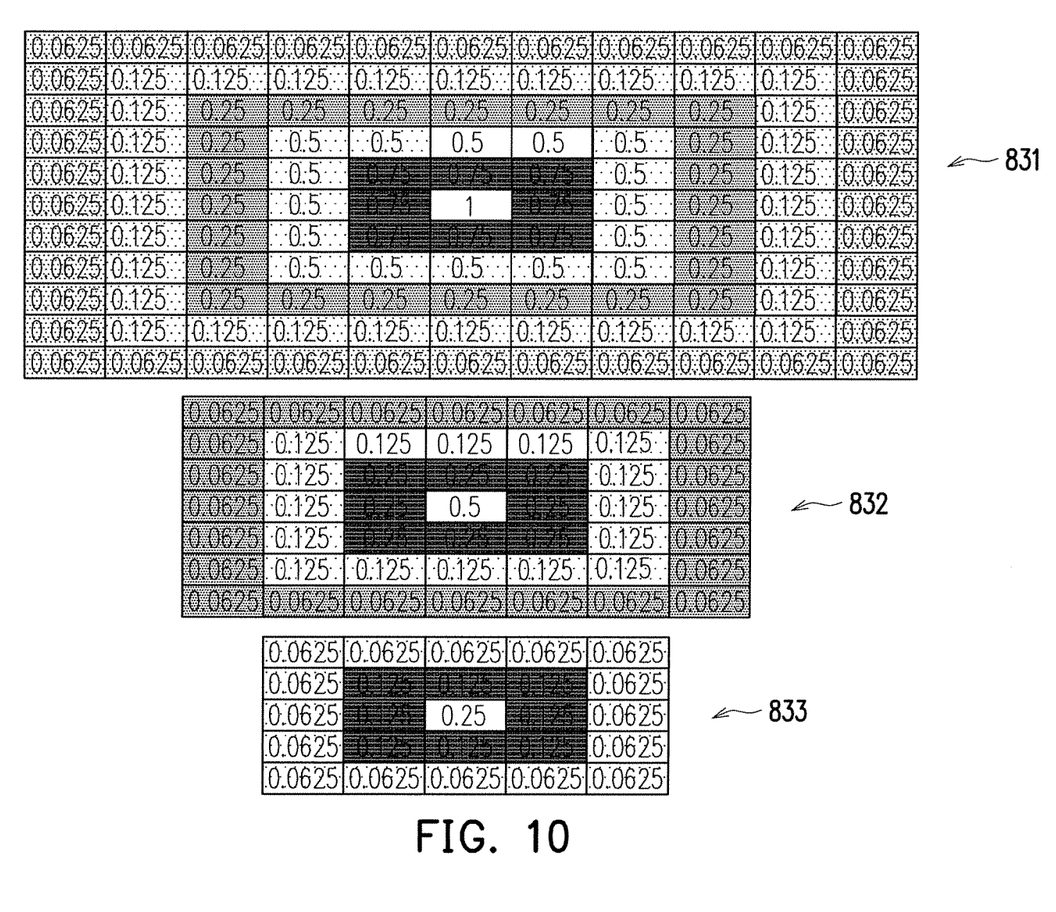
FIG. 10 is a schematic view illustrating diffusion matrices corresponding to block data of different gray level ranges according to an embodiment.

More specifically, referring to FIGS. 9 and 10, FIG. 9 is a schematic view illustrating display images corresponding to block data obtained according to different gray level ranges according to an embodiment. FIG. 10 is a schematic view illustrating diffusion matrices corresponding to block data of different gray level ranges according to an embodiment. FIG. 9 illustrates display images corresponding to the block data 821 to 823. Also, the diffusion matrices 831 to 833 corresponding to the block data 821 to 823 are as shown in FIG. 10. In addition, a size of the diffusion matrix 831 may be greater than a size of the diffusion matrix 832, and the size of the diffusion matrix 832 may be greater than a size of the diffusion matrix 833.

Figure 11:
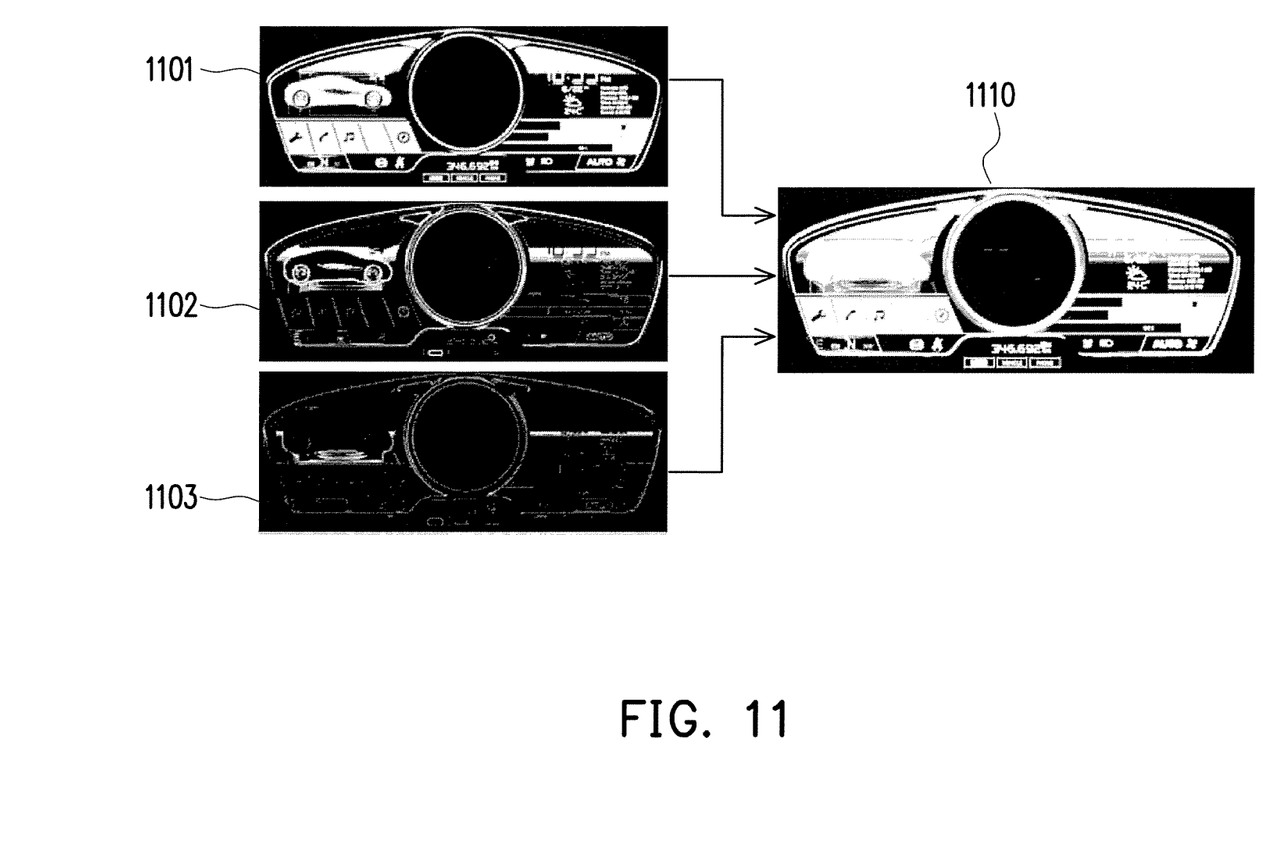
FIG. 11 is a schematic view illustrating merging of processed blocks according to an embodiment of the invention.

Moreover, referring to FIG. 11, FIG. 11 is a schematic view illustrating merging of processed blocks according to an embodiment of the invention. Display images corresponding to the processed block data generated at Steps S851 to S853 shown in FIG. 8 are as shown in images 1101 to 1103, and a display image corresponding to the adjusted image data after merging at Step S860 is as shown in an image 1110. The adjusted image data may serve as the basis to drive the second display panel.

It should be noted that, when the ambient brightness is greater than the brightness threshold value, the first display panel may be driven directly according to the image data. In addition, the light emission rate of the backlight module is set at 100%, and through a voltage boosting mechanism, a driving voltage for driving a plurality of light emitting devices in the backlight module is set to be greater than a preset voltage.

Figure 12:
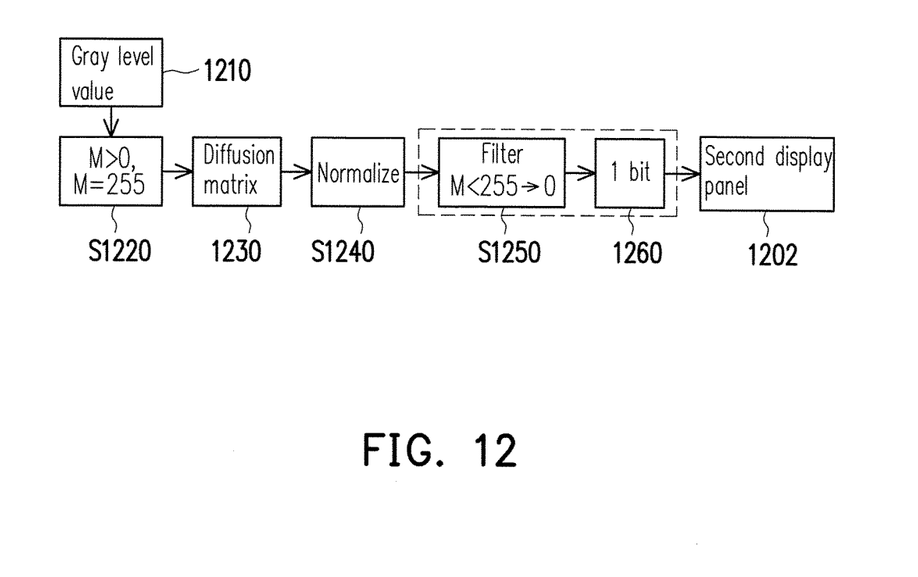
FIG. 12 is a schematic view illustrating an image processing method according to yet another embodiment of the invention.

Referring to FIG. 12, FIG. 12 is a schematic view illustrating an image processing method according to yet another embodiment of the invention. When the detected ambient temperature is not lower than the preset temperature value, the image processing method shown in FIG. 12 may be performed. An adjustment to image data may be performed for a gray level value 1210 of the image data through a determining mechanism at Step S1220. Specifically, at the Step S1220, whether each gray level value in the image data is greater than a reference value (e.g., 0) is determined. If the gray level value M in the image data is greater than the reference value, the gray level value is adjusted to a maximum value 255. Accordingly, binary image data are obtained. Then, computation (multiplication) is performed between the binary image data and a diffusion matrix 1230 to generate diffusion block data. In addition, the diffusion block data are normalized at Step S1240 to generate normalized image data. Here, the diffusion matrix 1230 may be an N×N unit matrix, and the normalization at Step S1240 may include dividing the diffusion block data by $N^2$. Through filtering at Step S1250, any of the gray level value M in the normalized block data less than 255 is adjusted to 0, and a plurality of one-bit adjusted image data 1260 are generated. The adjusted image data 1260 serves as the basis to drive the second display panel 1202.

In addition, when the ambient temperature is not lower than the preset temperature value, the first display panel may be driven directly according to the image data. Moreover, when the ambient temperature is not lower than the preset temperature value, the light emission rate of the backlight module may be less than 100%, or the driving voltage driving of the light emitting devices in the backlight module may be lower than the preset voltage to lower the brightness of the backlight module.

Figure 13:
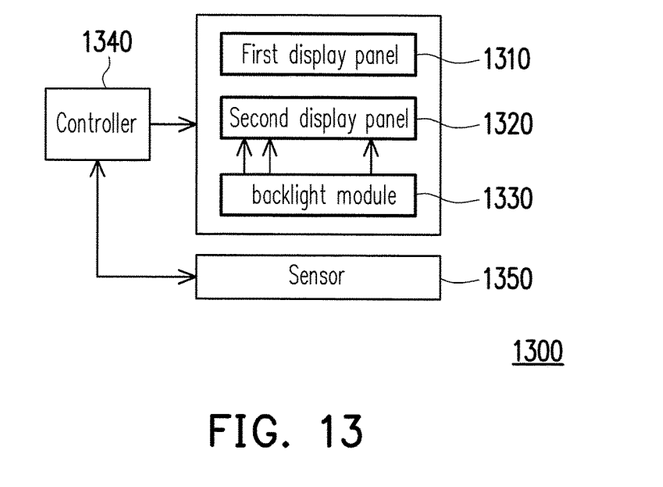
FIG. 13 is a schematic view illustrating a display apparatus according to an embodiment of the invention.

Referring to FIG. 13, FIG. 13 is a schematic view illustrating a display apparatus according to an embodiment of the invention. A display apparatus 1300 includes a first display panel 1310, a second display panel 1320, a backlight module 1330, a controller 1340, and a sensor 1350. The second display panel 1320 and the first display panel 1310 are disposed to be overlapped with each other. The backlight module 1330 is coupled to the second display panel 1320. The controller 1340 is coupled to the first display panel 1310, the second display panel 1320, and the backlight module 1330.

The controller 1340 receives the image data, and receives the detection results of the ambient temperature and the ambient brightness detected by the sensor 1350. When the ambient temperature is lower than the preset temperature value, the controller 1340 may select to divide the image data into the block data by display location or gray level range according to the ambient brightness. In addition, the blur process is performed on the block data to generate the adjusted image data. Moreover, the controller 1340 performs the binary process on the image data and generates the adjusted image data when the ambient temperature is not lower than the preset temperature value. The controller 1340 then drives the second display panel according to the adjusted image data.

Details about the controller 1340 carrying out the processes above are already described in the foregoing embodiments, and thus will not be repeated in the following.

Regarding the hardware framework of the controller 1340, the controller 1340 may be a processor having computing capability. Alternatively, the controller 1340 may be a hardware circuit designed according to the hardware description language (HDL) or other digital circuit design means that people having ordinary skills in the art are familiar with and implemented by means of the field programmable logic array (FPGA), the complex programmable logic device (CPLD), or the application-specific integrated circuit (ASIC).

In view of the foregoing, in the embodiments of the invention, the choice among the plurality of modes is made according to the ambient temperature and the ambient brightness to process the image data. In addition, the second display panel (rear display panel) is driven according to the adjusted image data. Accordingly, the display apparatus is able to render a desirable contrast and thus a desirable display quality under the conditions of different ambient temperatures and ambient brightnesses.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image processing method, adapted for a display apparatus having a first display panel, a second display panel, and a backlight module, the image processing method comprising:
   receiving image data;
   detecting an ambient temperature and an ambient brightness to obtain a detection result;
   selecting the image data to be divided into a plurality of block data by display location or gray level range according to the ambient brightness and performing a blur process on the block data to generate adjusted image data, when the ambient temperature is lower than a preset temperature value;
   performing a binary process on the image data to generate the adjusted image data when the ambient temperature is not lower than the preset temperature value; and
   driving the second display panel according to the adjusted image data.

2. The image processing method as claimed in claim 1, wherein selecting to divide the image data into the block data by display location or gray level range according to the ambient brightness and performing the blur process on the block data to generate the adjusted image data comprise:
   dividing the image data into the block data by display location when the ambient brightness is not greater than a brightness threshold value;
   respectively detecting a plurality of maximum gray level values of the block data and computing an average gray level value of the maximum gray level values;
   computing according to the respective maximum gray level values of the respective block data and the average gray level value to obtain a plurality of adjusted block data respectively corresponding to the block data; and
   performing the blur process on the adjusted block data to generate the adjusted image data.

3. The image processing method as claimed in claim 2, wherein computing according to the respective maximum gray level values of the respective block data and the average gray level value to obtain the adjusted block data respectively corresponding to the block data comprises:
   multiplying each of the maximum gray level values by a first weight value to obtain a first multiplication result, and multiplying the average gray level value by a second weight value to obtain a second multiplication result; and
   performing an add operation on the first multiplication result and the second multiplication result to obtain each of the adjusted block data,
   wherein the first weight value is less than the second weight value.

4. The image processing method as claimed in claim 3, wherein a total of the first weight value and the second weight value is equal to 1.

5. The image processing method as claimed in claim 3, wherein performing the add operation on the first multiplication result and the second multiplication result to obtain each of the adjusted block data comprises:
   adjusting a total of the first multiplication result and the second multiplication result according to an adjustment lookup table, and generating each of the adjusted block data accordingly.

6. The image processing method as claimed in claim 2, further comprising:
   computing a reciprocal of the adjusted image data to generate compensation data when the ambient brightness is not greater than the brightness threshold value; and
   synthesizing the compensation data and the image data and generating compensated image data, and driving the first display panel according to the compensated image data.

7. The image processing method as claimed in claim 2, further comprising:
   setting a light emission rate of the backlight module to be 100% when the ambient brightness is not greater than the brightness threshold value.

8. The image processing method as claimed in claim 1, wherein selecting to divide the image data into the plurality of block data by display location or gray level range according to the ambient brightness and performing the blur process on the block data to generate the adjusted image data comprise:
   dividing the image data into the block data according to gray level range when the ambient brightness is greater than the brightness threshold value;
   providing a plurality of diffusion matrices to perform computation respectively on the block data and generating a plurality of diffusion block data;
   respectively normalizing and filtering the diffusion block data to generate a plurality of processed block data; and
   synthesizing the processed block data to generate the adjusted image data.

9. The image processing method as claimed in claim 8, wherein a size of each of the diffusion matrices is negatively proportional to a gray level value of the corresponding block data.

10. The image processing method as claimed in claim 8, further comprising:
    directly driving the first display panel according to the image data when the ambient brightness is greater than the brightness threshold value.

11. The image processing method as claimed in claim 8, further comprising:
    setting a light emission rate of the backlight module to be 100% when the ambient brightness is greater than the brightness threshold value.

12. The image processing method as claimed in claim 8, further comprising:
    setting a driving voltage driving a plurality of light emitting devices in the backlight module to be greater than a preset voltage when the ambient brightness is greater than the brightness preset value.

13. The image processing method as claimed in claim 1, wherein performing the binary process on the image data to generate the adjusted image data when the ambient temperature is not lower than the preset temperature value comprises:
    comparing a plurality of gray level values in the image data with a reference value and generating binary image data according to a comparison result;
    providing a diffusion matrix for computation on the binary image data and normalizing a computation result to generate normalized image data; and filtering the normalized image data to generate the adjusted image data.

14. The image processing method as claimed in claim 13, further comprising:
directly driving the first display panel according to the image data when the ambient temperature is not greater than the preset temperature value.

15. The image processing method as claimed in claim 13, further comprising:
setting a light emission rate of the backlight module to be lower than 100% when the ambient temperature is not lower than the preset temperature value.

16. The image processing method as claimed in claim 13, further comprising:
setting a driving voltage driving a plurality of light emitting devices in the backlight module to be lower than a preset voltage when the ambient temperature is not lower than the preset temperature value.

17. A display apparatus, comprising:
a first display panel;
a second display panel, disposed to be overlapped with the first display panel;
a backlight module, coupled to the second display panel; and
a controller, coupled to the first display panel, the second display panel, and the backlight module; wherein the controller is configured to:
receive image data;
receive a detection result obtained by detecting an ambient temperature and an ambient brightness;
select the image data to be divided into a plurality of block data by display location or gray level range according to the ambient brightness and perform a blur process on the block data to generate adjusted image data, when the ambient temperature is lower than a preset temperature value;
perform a binary process on the image data to generate the adjusted image data when the ambient temperature is not lower than the preset temperature value; and
drive the second display panel according to the adjusted image data.

18. The display apparatus as claimed in claim 17, wherein the controller is configured to:
divide the image data into the block data by display location when the ambient brightness is not greater than a brightness threshold value;
respectively detect a plurality of maximum gay level values of the block data and compute an average gray level value of the maximum gray level values;
compute according to the respective maximum gray level values of the respective block data and the average gray level value to obtain a plurality of adjusted block data respectively corresponding to the block data; and
perform the blur process on the adjusted block data to generate the adjusted image data.

19. The display apparatus as claimed in claim 18, wherein when the ambient brightness is not greater than the brightness threshold value, the controller is configured to:
multiply each of the maximum gray level values by a first weight value to obtain a first multiplication result, and multiply the average gray level value by a second weight value to obtain a second multiplication result; and
perform an add operation on the first multiplication result and the second multiplication result to obtain each of the adjusted block data,
wherein the first weight value is less than the second weight value.

20. The display apparatus as claimed in claim 18, wherein when the ambient brightness is not greater than the brightness threshold value, the controller is configured to:
adjust a total of the first multiplication result and the second multiplication result according to an adjustment lookup table, and generate each of the adjusted block data accordingly.

21. The display apparatus as claimed in claim 18, wherein when the ambient brightness is not greater than the brightness threshold value, the controller is further configured to:
generate compensation data according to a reciprocal of the adjusted image data; and
synthesize the compensation data and the image data and generate compensated image data, and drive the first display panel according to the compensated image data.

22. The display apparatus as claimed in claim 18, wherein when the ambient brightness is not greater than the brightness threshold value, the controller is further configured to:
set a light emission rate of the backlight module to be 100%.

23. The display apparatus as claimed in claim 17, wherein when the ambient brightness is greater than the brightness threshold value, the controller is configured to:
divide the image data into the block data according to gray level range;
provide a plurality of diffusion matrices to perform computation respectively on the block data and generate a plurality of diffusion block data;
respectively normalize and filter the diffusion block data to generate a plurality of processed block data; and
synthesize the processed block data to generate the adjusted image data.

24. The display apparatus as claimed in claim 23, wherein when the ambient brightness is greater than the brightness threshold value, the controller is further configured to:
drive the first display panel directly according to the image data.

25. The display apparatus as claimed in claim 23, wherein when the ambient brightness is greater than the brightness threshold value, the controller is further configured to:
set a light emission rate of the backlight module to be 100%, or set a driving voltage driving a plurality of light emitting devices in the backlight module to be greater than a preset voltage.

26. The display apparatus as claimed in claim 17, wherein when the ambient temperature is not greater than the preset temperature value, the controller is configured to:
compare a plurality of gray level values in the image data with a reference value and generate binary image data according to a comparison result;
provide a diffusion matrix for computation on the binary image data and normalize a computation result to generate normalized image data; and
filter the normalized image data to generate the adjusted image data.

27. The display apparatus as claimed in claim 26, wherein when the ambient temperature is not greater than the preset temperature value, the controller is further configured to:
drive the first display panel directly according to the image data.

28. The display apparatus as claimed in claim 17, wherein when the ambient temperature is not lower than the preset temperature value, the controller further sets a light emission rate of the backlight module to be less than 100%, or setting a driving voltage driving a plurality of light emitting devices in the backlight module to be lower than a preset voltage.

* * * * *